United States Patent
Oya

(10) Patent No.: US 11,403,837 B2
(45) Date of Patent: Aug. 2, 2022

(54) IMAGE PROCESSING APPARATUS HAVING CHECKING IMAGE DATA ERRONEOUS RECOGNITION, METHOD FOR CONTROL THE SAME, AND STORAGE MEDIUM

(71) Applicant: CANON KABUSHIKI KAISHA, Tokyo (JP)

(72) Inventor: Hiroshi Oya, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 78 days.

(21) Appl. No.: 16/907,902

(22) Filed: Jun. 22, 2020

(65) Prior Publication Data

US 2020/0410277 A1 Dec. 31, 2020

(30) Foreign Application Priority Data

Jun. 27, 2019 (JP) .............................. JP2019-120046

(51) Int. Cl.
*G06V 10/40* (2022.01)
*H04N 1/00* (2006.01)
*G06V 30/10* (2022.01)

(52) U.S. Cl.
CPC ......... *G06V 10/40* (2022.01); *H04N 1/00408* (2013.01); *G06V 30/10* (2022.01)

(58) Field of Classification Search
CPC .. G06K 9/46; G06K 2209/01; G06K 9/00442; H04N 1/00408
USPC ....................................................... 382/229
See application file for complete search history.

(56) References Cited

U.S. PATENT DOCUMENTS

| | | | | |
|---|---|---|---|---|
| 10,176,399 | B1* | 1/2019 | Rivard | G06K 9/344 |
| 2015/0304520 | A1* | 10/2015 | Nakamura | H04N 1/00411 |
| | | | | 358/403 |
| 2019/0114313 | A1* | 4/2019 | Roebuck | G06F 40/174 |

FOREIGN PATENT DOCUMENTS

JP 2005-234708 A 9/2005

OTHER PUBLICATIONS

Sugiura, JP 2005-234708, Publication Date Feb. 9, 2005; Ricoh; Cited portions of English Translation and Figures.*

* cited by examiner

*Primary Examiner* — Neil R McLean
(74) *Attorney, Agent, or Firm* — Canon U.S.A., Inc. IP Division

(57) ABSTRACT

An image processing apparatus includes a character recognition unit, a storage unit, a display unit, and a reception unit. The character recognition unit is configured to recognize characters included in a plurality of pieces of image data. The storage unit is configured to perform control such that the plurality of pieces of image data is stored in a folder named with a character string including the characters recognized by the character recognition unit. The display unit is configured to display a screen. The reception unit is configured to receive a setting for a condition made by a user. In a case where the character string including the characters recognized by the character recognition unit does not satisfy the condition, the display unit displays a screen including information indicating image data in which the characters are recognized.

12 Claims, 17 Drawing Sheets

DEVICE SERIAL No: abcd0101

APPLICATION MANAGEMENT | ONE-TOUCH SCAN AND SEND > DETAILED INFORMATION > BUTTON EDITING > KEYWORD SETTINGS

KEYWORD SETTINGS SCREEN

[ OK ] ~709    [ CANCEL ] ~710

CHARACTER RECOGNITION CONDITIONS

CHARACTER RECOGNITION SETTINGS

CHARACTER TYPE: [ ONLY NUMBERS ▼ ] ~701

NUMBER OF CHARACTERS

LOWER LIMIT: [ 3 ] ~702
UPPER LIMIT: [ 10 ] ~703

POSITION OF CHARACTER TO BE EXTRACTED FROM UPPER LEFT OF DOCUMENT

X-COORDINATE: [ 10 ] cm ~704
Y COORDINATE: [ 20 ] cm ~705
WIDTH: [ 15 ] cm ~706
HEIGHT: [ 5 ] cm ~707

TRANSMISSION DESTINATION WHEN ERROR HAS OCCURRED: [ \\file server\error folder ] ~708

FIG.8

DEVICE SERIAL No: abcd0101
APPLICATION MANAGEMENT | ONE-TOUCH SCAN AND SEND > DETAILED INFORMATION > BUTTON EDITING > SELECT FROM ADDRESS BOOK

SELECT FROM ADDRESS BOOK ~800

PLEASE SELECT DESTINATION FROM ADDRESS BOOK AND CLICK [OK]

805~ [OK]  [CANCEL] ~806

ADDRESS BOOK
TYPE: 801~ [BEST MEMBERS ▼] [DISPLAY SWITCHING] ~802
BEST MEMBERS

| SELECT | NUMBER | TYPE | NAME | DESTINATION |
|---|---|---|---|---|
| ☒ | 01 | ✉ | email_a | email_a@sample.co.jp |
| ☒ | 02 | ✉ | email_b | email_b@sample.co.jp |
| ☒ | 03 | 📄 | REFERRAL FORM | \\file server\referral form |
| ☐ | 04 | 📄 | INQUIRY FORM | \\file server\inquiry form |

| JOB ID | PAGE NUMBER | CHARACTER RECOGNITION RESULT | CHARACTER RECOGNITION AREA IMAGE DATA | | ERROR PAGE IMAGE DATA | | TRANSMISSION FILE NAME |
|---|---|---|---|---|---|---|---|
| | | | START ADDRESS | DATA SIZE | START ADDRESS | DATA SIZE | |
| 1 | 3 | " " | 0x234567 | 1000 | 0x456789 | 10000 | 20190501084702.pdf |
| 1 | 7 | "/////" | 0x345678 | 2000 | 0x567890 | 11000 | 20190501084826.pdf |

FIG.10B

| PAGE NUMBER | ERROR FLAG |
|---|---|
| 1 | 0 |
| 2 | 0 |
| 3 | 1 |
| 4 | 0 |
| 5 | 0 |
| 6 | 0 |
| 7 | 1 |
| 8 | 0 |
| 9 | 0 |
| 10 | 0 |

FIG.11A

INQUIRY FORM — 1100

1101 — CHARACTER RECOGNITION FOR IMAGE SHOWN BELOW HAS FAILED. PLEASE CHECK IF THERE IS ANY PROBLEM WITH DOCUMENT. FOR EXAMPLE, PLEASE CHECK IF CHARACTER INPUT HAS BEEN COMPLETED, OR IF DOCUMENT COMPLIES WITH PRESET FORMAT.

1106

INQUIRY FORM
Consultation Date May 1st
Name Taro Yamada
Consultation Site Department of Otolaryngology
ID

INQUIRY FORM
Consultation Date May 1st
Name Jiro Suzuki
Consultation Site Department of Internal Medicine
ID //////

1103
1102
1104
1105 pageNo: 3
File: 20190501084702.pdf pageNo: 7
File: 20190501084826.pdf

TRANSMISSION PROCESSING HAS NORMALLY ENDED

INQUIRY FORM

CHARACTER RECOGNITION FOR IMAGE SHOWN BELOW HAS FAILED. PLEASE CHECK IF THERE IS ANY PROBLEM WITH DOCUMENT. FOR EXAMPLE, PLEASE CHECK IF CHARACTER INPUT HAS BEEN COMPLETED, OR IF DOCUMENT COMPLIES WITH PRESET FORMAT.

ID

JobID: 1
pageNo: 3
File: 20190501084702.pdf

ID 1111111

JobID: 1
pageNo: 7
File: 20190501084826.pdf

TRANSMISSION PROCESSING HAS NORMALLY ENDED

INQUIRY FORM

LIST OF PAGES WHERE CHARACTER EXTRACTION HAS FAILED

1211~ page3

1212~ page7

TRANSMISSION PROCESSING HAS NORMALLY ENDED

INQUIRY FORM

CHARACTER RECOGNITION FOR IMAGE SHOWN BELOW HAS FAILED. PLEASE CHECK IF THERE IS ANY PROBLEM WITH DOCUMENT. FOR EXAMPLE, PLEASE CHECK IF CHARACTER INPUT HAS BEEN COMPLETED, OR IF DOCUMENT COMPLIES WITH PRESET FORMAT.

ID 1111111

JobID: 1
pageNo: 3
File: 20190501084826.pdf

TRANSMISSION PROCESSING HAS NORMALLY ENDED

BACK   OK

FIG.15

○ Error History 1
· Occurrence Date: 2019-05-01 47:02
· Transmission File Name: 20190501084702.pdf
· Job ID: 1
· Page Number: 3
· Character Recognition Result: " "
· Character Recognition Area Image

| ID |
|---|

○ Error History 2
· Occurrence Date: 2019-05-01 47:55
· Transmission File Name: 20190501084755.pdf
· Job ID: 1
· Page Number: 7
· Character Recognition Result: "///////"
· Character Recognition Area Image

| ID 1111111 |
|---|

IMAGE PROCESSING APPARATUS HAVING CHECKING IMAGE DATA ERRONEOUS RECOGNITION, METHOD FOR CONTROL THE SAME, AND STORAGE MEDIUM

BACKGROUND

Field

One disclosed aspect of the embodiments relates to an image processing apparatus having checking image data erroneous recognition, a method for controlling the image processing apparatus, and a storage medium.

Description of the Related Art

Japanese Patent Application Laid-Open No. 2005-234708 discusses an image processing apparatus that generates image data by reading an image on a document, performs character recognition processing on an area designated by a user in advance, and transmits the image data to a folder a folder name of which is a character string obtained in the character recognition processing.

If an erroneous character string is obtained through character recognition processing performed by the image processing apparatus that stores image data in a folder a folder name of which is a character string obtained through the character recognition processing, the image data is stored in the folder with the folder name that is not intended by the user.

In order to prevent image data from being transmitted to the folder that is not intended by the user, the image data can be stored in an error folder if the character string obtained through the character recognition processing does not satisfy a predetermined condition. The user then cannot recognize which one of the pieces of image data is stored in the error folder, and thus the user needs to refer to the error folder to check which one of the pieces of image data is stored in the error folder, which requires a lot of time and labor.

SUMMARY

In view of the above-described issue, the disclosure is directed to providing a mechanism for enabling a user to easily check in which image data erroneous recognition of a character string has occurred, in an image processing apparatus that stores image data in a folder named with a character string obtained through character recognition processing.

According to an aspect of the embodiments, an image processing apparatus includes a character recognition unit, a display unit, and a reception unit. The character recognition unit is configured to recognize characters included in a plurality of pieces of image data. The storage unit is configured to perform control such that the plurality of pieces of image data is stored in a folder named with a character string including the characters recognized by the character recognition unit. The display unit is configured to display a screen. The reception unit is configured to receive a setting for a condition made by a user. In a case where the character string including the characters recognized by the character recognition unit does not satisfy the condition, the display unit displays a screen including information indicating image data in which the characters are recognized.

Further features of the disclosure will become apparent from the following description of exemplary embodiments with reference to the attached drawings.

BRIEF DESCRIPTION OF THE DRAWINGS

FIG. 7 illustrates an example of a character recognition processing setting screen.

FIG. 8 illustrates an example of an address selection screen.

FIG. 10A illustrates an example of page information, and FIG. 10B illustrates an example of an error flag.

FIGS. 11A and 11B each illustrate an example of an error screen.

FIGS. 12A and 12B each illustrate an example of an error screen which is displayed when a display area within a touch panel is not sufficiently large.

FIG. 13 illustrates an example of an error screen.

FIG. 15 illustrates an example of an error log.

DESCRIPTION OF THE EMBODIMENTS

Modes for carrying out the disclosure will be described below with reference to the accompanying drawings. Configurations described in the following exemplary embodiments are merely examples, and the disclosure is not limited to the illustrated configurations.

Figure 1:
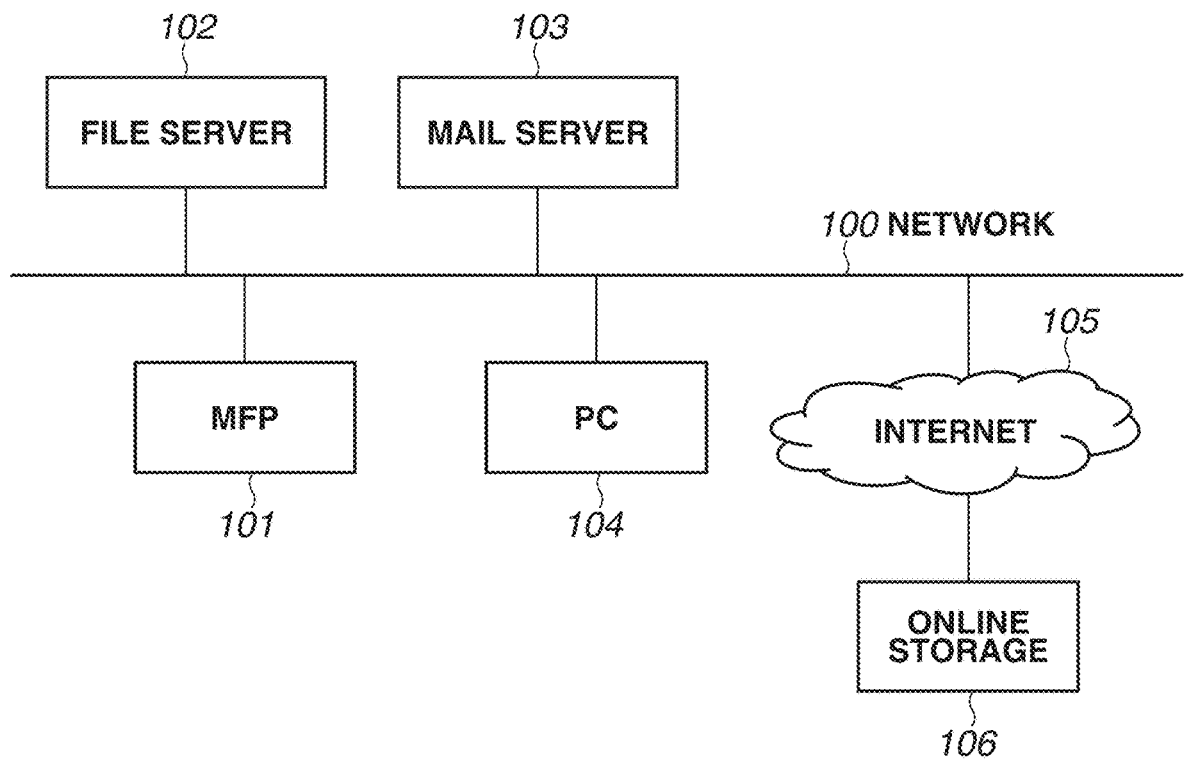
FIG. 1 is a block diagram illustrating an example of a configuration of a reading system.

A first exemplary embodiment of the disclosure will be described below. FIG. 1 is a block diagram illustrating an example of a configuration of a reading system according to the present exemplary embodiment. The reading system according to the first exemplary embodiment includes a multi-function peripheral (MFP) 101, which is an example of an image processing apparatus, a file server 102, which is an example of an information processing apparatus, a mail server 103, and an online storage 106. The MFP 101, the file server 102, the mail server 103, and the online storage 106 are each connected to a local area network (LAN) 100. The MFP 101, the file server 102, the mail server 103, and a personal computer (PC) 104 are connected to each other on the LAN 100 via a network. The MFP 101 and the online storage 106 can communicate with each other via the LAN 100 and the Internet 105.

The MFP 101 transmits image data generated by reading an image on a document to each of the file server 102, the mail server 103, and the online storage 106. Image data in the present exemplary embodiment is not limited to electronic data obtained by converting an image into raw data, but instead may be electronic data based on an image format, such as a Tagged Image File Format (TIFF) or Joint Photographic Experts Group (JPEG), or electronic data based on a portable document format (PDF). The file server 102 is a file server compliant with a file transfer protocol (FTP) and a server message block (SMB) protocol. The mail server 103 is a mail server compliant with a simple mail transfer protocol (SMTP). The online storage 106 is an online storage compliant with Web Distributed Authoring and Versioning (WebDAV) (which is a file sharing protocol using a hypertext transfer protocol (HTTP)). The PC 104 can access a web server included in the MFP 101 by using the HTTP, and can refer to and update setting values. The LAN 100 may be a wired LAN using Ethernet, or may be a wireless LAN.

Figure 2:
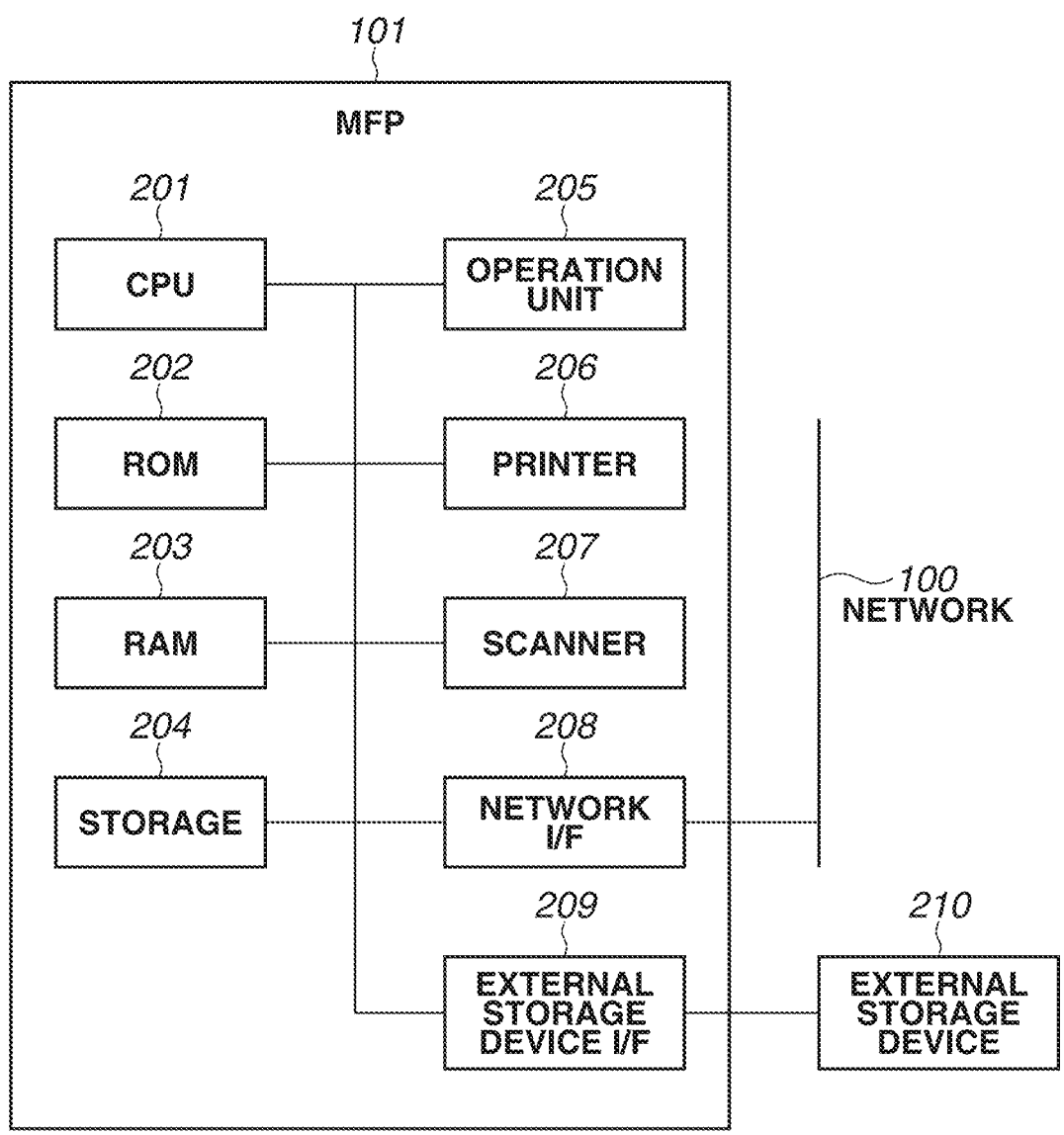
FIG. 2 is a block diagram illustrating an example of a hardware configuration of a multi-function peripheral (MFP).

FIG. 2 is a block diagram illustrating an example of a hardware configuration of the MFP 101. The MFP 101 includes a central processing unit (CPU) 201, a read-only memory (ROM) 202, a random access memory (RAM) 203, a storage 204, an operation unit 205, a printer 206, a scanner 207, a network interface (I/F) 208, and an external storage device I/F 209.

The CPU 201 controls the various hardware modules 202 to 208 included in the MFP 101, thus implementing functions included in the MFP 101. The CPU 201 sends signals to the various hardware modules via a bus line to implement data communication with other hardware modules.

The CPU 201 of the MFP 101 further controls the operation of the MFP 101 in accordance with control programs stored in the ROM 202. More specifically, the CPU 201 executes an operating system (OS) for controlling the MFP 101 and driver programs for controlling the hardware modules. Application programs installed in the OS operate mutually, thus performing operation and control of functions desired by a user. The OS and various programs are stored in the ROM 202 and are executed by being read into the RAM 203.

The ROM 202 is a memory for programs and various data to be used by the CPU 201. The RAM 203 is a work memory for temporarily storing programs and data to be used for calculations by the CPU 201. The storage 204 is a storage device that stores various data, various programs, and the like.

In the present exemplary embodiment, it is assumed that a flash memory is used as the storage 204, but instead an auxiliary storage device, such as a solid state drive (SSD), a hard disk drive (HDD), or an embedded Multi Media Card (eMMC) may be used. It is also assumed that the MFP 101 has a configuration in which a single CPU 201 executes each process illustrated in a flowchart to be described below by using a single memory (RAM 203). However, the MFP 101 may have another configuration. For example, each process illustrated in the flowchart to be described below can be executed by a plurality of CPUs, a plurality of RAMs, a plurality of ROMs, and a plurality of storages being operated in cooperation with each other. Further, some of the processes may be executed by a hardware circuit, such as an application specific integrated circuit (ASIC) or a field programmable gate array (FPGA).

The operation unit 205 is a user interface, such as a touch panel, which is used for the user to operate the MFP 101, and functions as a reception unit that receives an operation or input by the user. The operation unit 205 can also be used as a display unit that displays a screen for, for example, operating the MFP 101.

The printer 206 is a unit that implements a print function. The CPU 201 controls the printer 206 to execute a print job received from the PC 104, so that an image is printed on a sheet. The print job described herein refers to data including an instruction for causing the MFP 101 to execute print processing, image data, and print setting information.

The scanner 207 is a unit that implements a scan function. The CPU 201 controls the scanner 207 to optically read an image on a document, and performs processing for creating image data.

The network I/F 208 is a network I/F for performing wired LAN communication, such as Ethernet, but instead may be a network I/F for performing wireless LAN communication, a universal serial bus (USB)-LAN I/F, or the like.

The external storage device I/F 209 is an I/F used for the MFP 101 to establish communication with an external storage device 210. The CPU 201 controls the external storage device I/F 209, thus causing the external storage device 210 to store image data. In the present exemplary embodiment, it is assumed that a USB interface is used as the external storage device I/F 209 and a USB memory is used as the external storage device 210. Alternatively, a secure digital (SD) card slot for communicating with an external storage device, such as an SD card, may be used as the external storage device I/F 209.

Figure 3:
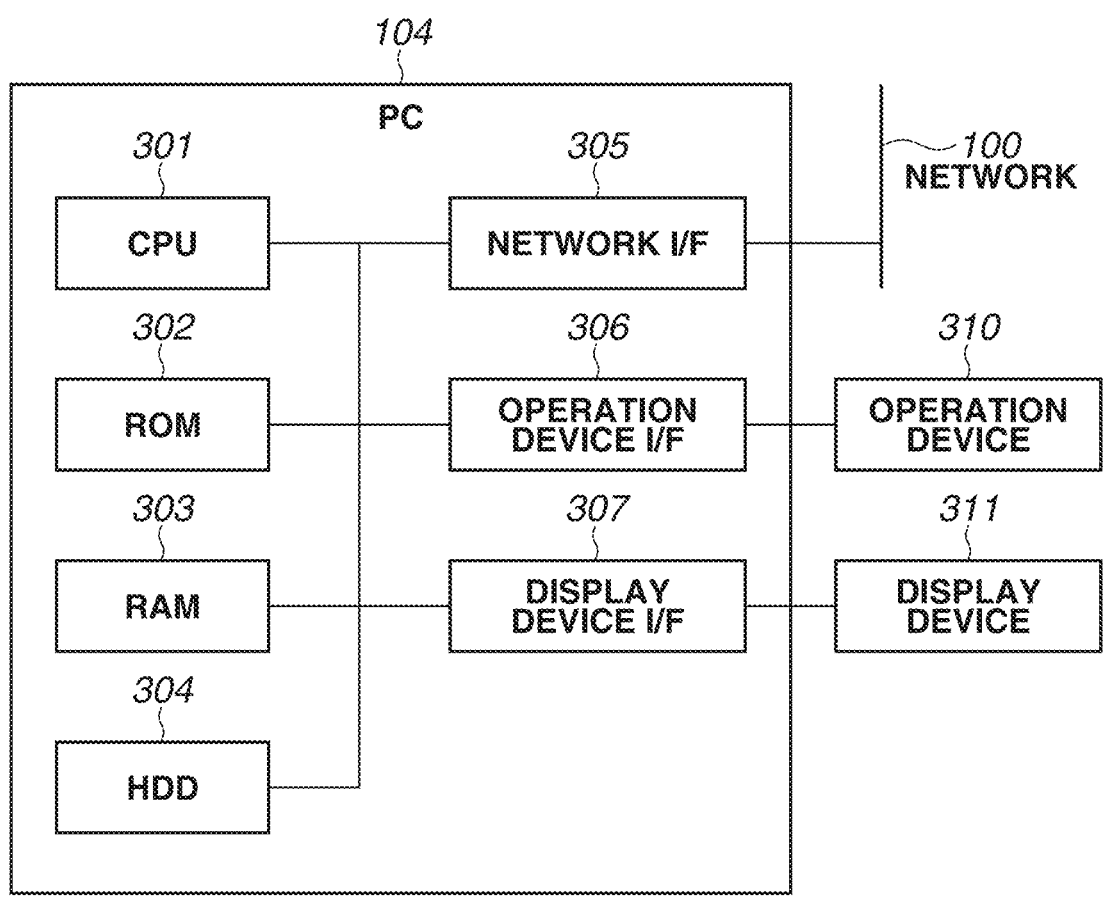
FIG. 3 is a block diagram illustrating an example of a hardware configuration of a personal computer (PC).

FIG. 3 is a block diagram illustrating an example of a hardware configuration of the PC 104. The PC 104 includes a CPU 301, a ROM 302, a RAM 303, an HDD 304, a network I/F 305, an operation device I/F 306, and a display device I/F 307.

The CPU 301 controls the various hardware modules 302 to 307 constituting the PC 104, thus implementing functions included in the PC 104. The CPU 301 sends signals to the various hardware modules via a bus line, thus implementing data communication with other hardware modules.

The CPU 301 of the PC 104 controls the operation of the PC 104 in accordance with control programs stored in the ROM 302. Specifically, the CPU 301 executes an OS and the like for controlling the PC 104. Application programs installed in the OS operate mutually to perform operation and control of functions desired by the user. The OS and various programs are stored in the ROM 302 and are executed by being read into the RAM 302.

The ROM 302 is a memory for storing programs and various data to be used for the CPU 301. The RAM 303 is a work memory for temporarily storing programs and data to be used for calculations by the CPU 301. The HDD 304 is a storage device that stores various data, various programs, and the like.

The network I/F 305 is a network I/F for performing wired LAN communication, such as Ethernet, but instead may be a network I/F for performing wireless LAN communication, a USB-LAN I/F, or the like.

The operation device I/F 306 is used for connecting an operation device 310, such as a keyboard and a mouse, with the PC 104.

The display device I/F 307 is used for connecting a display device 311, such as a liquid crystal monitor, with the PC 104.

The PC 104 according to the present exemplary embodiment is connected to an external operation device and an external display device. Alternatively, an operation unit and a display unit may be incorporated in the PC 104.

Figure 4:
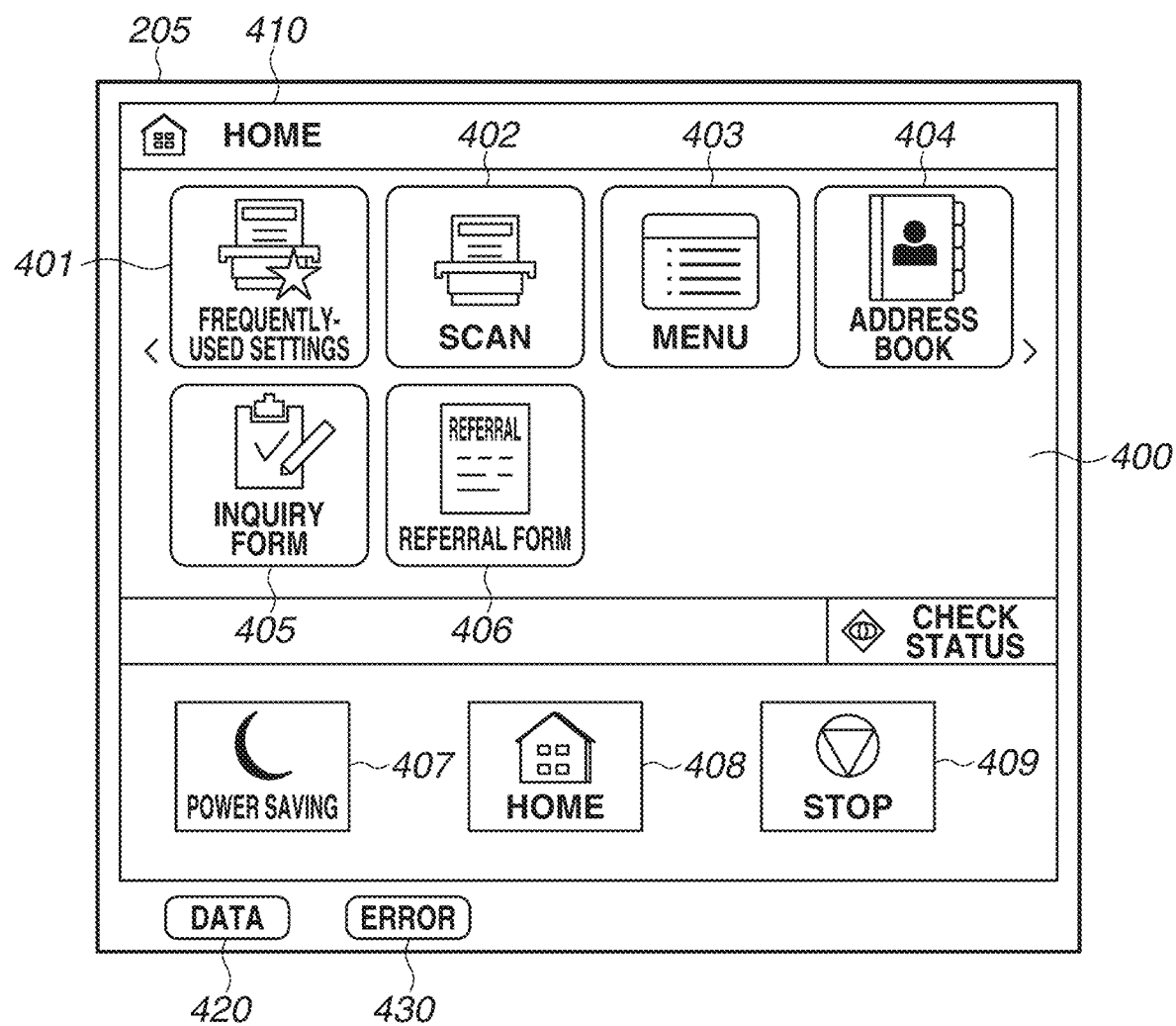
FIG. 4 illustrates an example of a screen which is displayed on an operation unit.

FIG. 4 illustrates an example of a screen to be displayed on the operation unit 205. The operation unit 205 includes a touch panel 410, a data light-emitting diode (LED) 420, and an error LED 430. On the touch panel 410, a home screen 400 to be displayed immediately after the MFP 101 is started is displayed. The home screen 400 is used for issuing an instruction to execute the functions of the MFP 101. On the home screen 400, a frequently-used settings button 401, a scan button 402, a menu button 403, an address book button 404, an inquiry form button 405, and a referral form button 406 among other buttons are displayed. Further, a power saving button 407, a home button 408, and a stop button 409 are constantly displayed on the home screen 400. The operation unit 205 may include the power saving button 407, the home button 408, and the stop button 409 as hardware keys.

The frequently-used settings button 401 is used for displaying a screen for executing a specific function in a state where settings made by the user are input, when the button is selected by the user.

The scan button 402 is used for displaying a screen for generating image data by scan processing being executed, transmitting the generated image data by mail transmission or file transmission, and storing the generated image data in the external storage device 210, when the button is selected by the user. The term "mail transmission" used herein refers to transmission of image data that is generated by a document being read, with the generated image data attached to an electronic mail. The term "file transmission" used herein refers to transmission of image data to, for example, the file server 102, and the PC 104 by using a communication protocol, such as a SMB protocol or FTP.

The menu button 403 is used for displaying a menu screen when the button is selected by the user.

The address book button 404 is used for displaying a screen for displaying registered addresses (destination information) when the button is selected by the user. The screen for displaying addresses displays destination information including a transmission type, such as electronic mail transmission, SMB transmission, FTP transmission, and WebDAV transmission, a mail address, a host name, and server information.

Each of the inquiry form button 405 and the referral form button 406 is a one-touch-send button. The one-touch-send button is used for displaying a screen for reading an image on a document based on a scan setting preliminarily made by the user, creating image data, and transmitting the generated image data based on a preset transmission type when the button is selected by the user. In other words, the selection of the inquiry form button 405 indicates reception of a reading execution instruction.

The power saving button 407 is used for causing the MFP 101 to transition to a power saving state when the button is selected by the user.

The home button 408 is used for displaying the home screen 400 on the operation unit 205 when the button is selected by the user.

The stop button 409 is used for cancelling the execution of a job, such as a print job, which is being executed by the MFP 101, when the button is selected by the user. When the stop button 409 is selected by the user, the execution of another job, such as a copy job or a transmission job, may be cancelled.

The data LED 420 and the error LED 430 are used to notify the user of the state of the MFP 101. The data LED 420 illuminates during execution of electronic mail transmission or file transmission. The error LED 430 illuminates when an error occurs in the MFP 101.

The home screen 400 is a function selection screen for selecting functions to be used by the user from among a plurality of functions including a copy function for performing printing based on image data and a transmission function for reading a document, generating image data, and transmitting the generated image data to an external apparatus.

Figure 5:
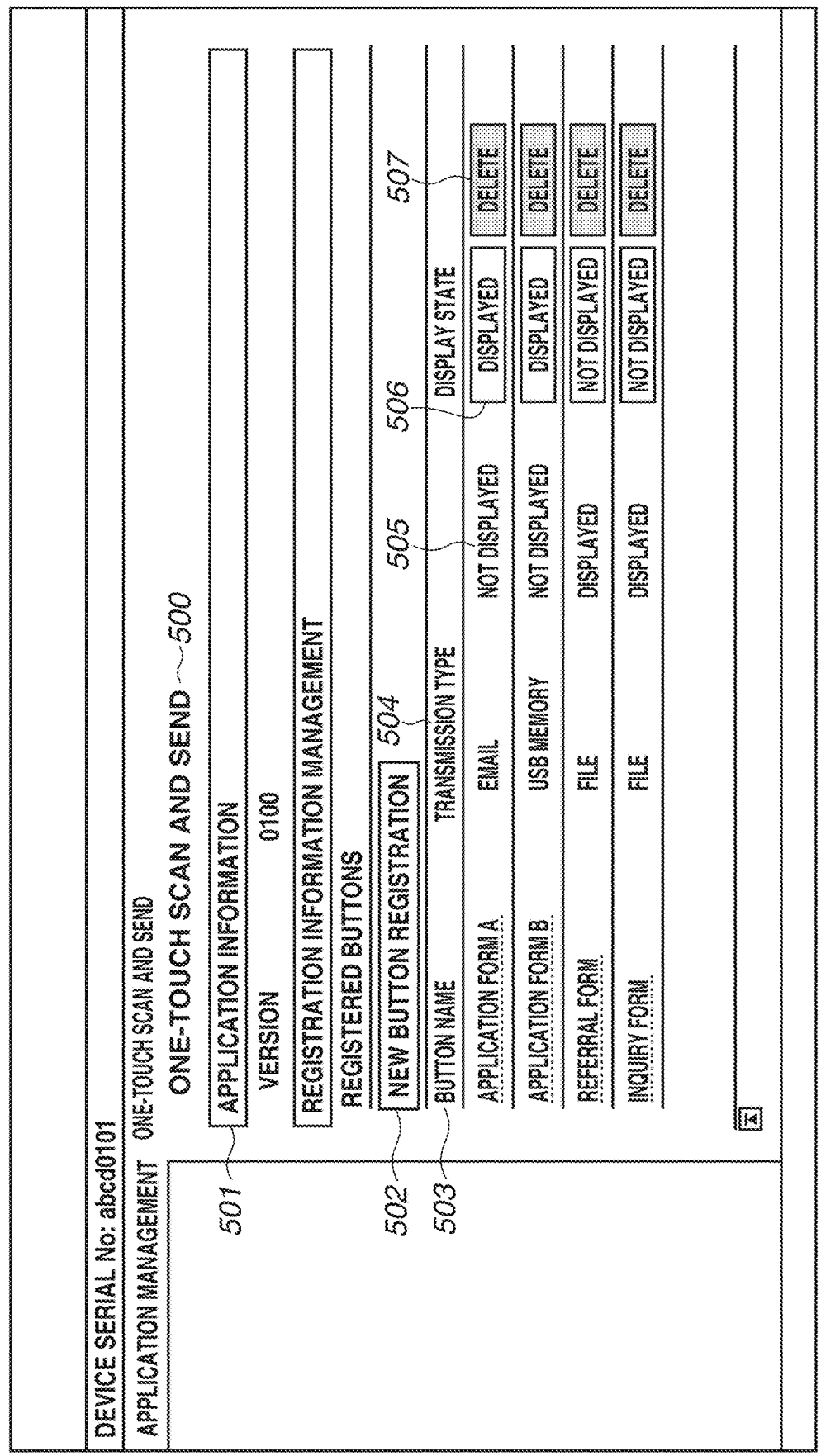
FIG. 5 illustrates an example of a one-touch scan-and-send setting screen which is displayed on a display device.

FIG. 5 illustrates an example of a one-touch scan-and-send setting screen to be displayed on the display device 311.

A one-touch scan-and-send setting screen 500 illustrated in FIG. 5 is displayed on, for example, the display device 311 connected to the PC 104 that has accessed the web server of the MFP 101 over HTTP communication.

On the one-touch scan-and-send setting screen 500, application information 501, a new button registration button 502, items 503 to 505, a display/non-display switching button 506, and a delete button 507 are displayed.

The application information 501 is an area for displaying an application version. A version number 1.00 is displayed in FIG. 5.

Figure 6:
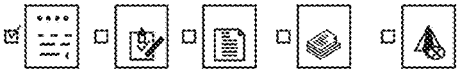
FIG. 6 illustrates an example of a button setting editing screen for executing a one-touch scan-and-send function.

The new button registration button 502 is displayed on a screen displayed on the operation unit 205 when the button is selected by the user. The new button registration button 502 is a button for registering a new button for executing a one-touch scan-and-send function. When the new button registration button 502 is selected, a button setting editing screen 600 illustrated in FIG. 6 is displayed on the display device 311. The button setting editing screen 600 illustrated in FIG. 6 will be described in detail below.

The item 503 indicates the name of each button for executing the one-touch scan-and-send function registered in the MFP 101.

The item 504 indicates a transmission type set for each button for executing the one-touch scan-and-send function registered in the MFP 101.

The item 505 indicates a display state of each button for executing the one-touch scan-and-send function registered in the MFP 101. In addition, the display/non-display switching button 506 for changing the display state and the delete button 507 are displayed. For example, in a case where the display state of the "referral form" button indicates "displayed", a button, such as the referral form button 406 illustrated in FIG. 4, is displayed on the home screen 400 on the touch panel 410. The display/non-display switching button 506 is a button that can toggle between "displayed" and "not displayed" for each button.

When the delete button 507 is selected by the user, button information registered in the MFP 101 is deleted.

As an example of the buttons for executing the one-touch scan-and-send function registered in the MFP 101, for a button named with "application form A", the transmission type indicates "email", and the display state indicates "not displayed". Not only when the new button registration button 502 is selected, but also when the button named with "application form A" is selected, the button setting editing screen 600 illustrated in FIG. 6 is displayed on the display device 311.

Referring back to FIG. 5, four buttons, i.e., "application form A", "application form B", "referral form", and "inquiry form", are registered. The display state for each of "referral form" and "inquiry form" buttons indicates "displayed", and thus the "referral form" and "inquiry form" buttons are displayed on the home screen 400. However, the display state for each of "application form A" and "application form B" buttons indicates "not displayed", and thus the "application form A" and "application form B" buttons are not displayed on the home screen 400.

FIG. 6 illustrates an example of the button setting editing screen for executing the one-touch scan-and-send function. The button setting editing screen 600 illustrated in FIG. 6 is displayed on, for example, the display device 311 connected to the PC 104 that has accessed the web server of the MFP 101 through HTTP communication.

The button setting editing screen 600 is displayed when the new button registration button 502 illustrated in FIG. 5 or the name of the button is selected by the user. In a case where the button setting editing screen 600 is displayed when the name of the button is selected by the user, the button setting editing screen 600 is displayed in a state where a previously set value is input in each item on the button setting editing screen 600. In a case where the button setting editing screen 600 is displayed when the new button registration button 502 is selected by the user, the button setting editing screen 600 is displayed in a state where no value is input in each item on the button setting editing screen 600. A default value may be preliminarily input in each item on the button setting editing screen 600.

An input field 601 is an input field for setting the name of the one-touch-send button. A character string "inquiry form" is input in the input field 601. The term "one-touch-send button" used herein refers to a button for executing the one-touch scan-and-send function when the button is selected by the user.

A pull-down 602 is an object for setting a file name. The pull-down 602 enables selection of "button name" and "automatic". When "button name" is selected, the button name input in the input field 601 is set to the name of a file to be transmitted. In a case where "automatic" is selected, an automatically determined character string indicates the name of the file. For example, the date and time when scanning is executed after the one-touch-send button registered on the screen illustrated in FIG. 6 is selected is set to the name of the file.

When a checkbox 603 is checked, a keyword that is input during file output is enabled. Specifically, a function for using a character string that is recognized and obtained in character recognition processing as the name of a folder to which image data is transmitted is enabled. The present exemplary embodiment illustrates an example where the inquiry form button 405 is checked in the checkbox 603. A description of operation to be performed when the inquiry form button 405 is not checked in the checkbox 603 in the flowchart to be described below will be omitted.

A keyword character string setting button 604 is used for displaying a keyword character string setting screen 700 illustrated in FIG. 7 when the button is selected by the user.

A pull-down 605 is an object for making a setting as to whether to organize files to be transmitted. The pull-down 605 enables selection of any one of "not organize", "organize (file)", "organize (folder)", and "organize (file and folder)". In a case where "not organize" is set, image data is transmitted to a folder with a folder path as a transmission destination which is displayed in an area 609 (described below). In a case where "organize (file)" is set, an output file name includes a keyword. When "organize (folder)" is set, a folder name of a folder for storing a file includes the keyword. In a case where "organize (file and folder)" is set, a file name and a folder name of a folder to which the file is to be output include a keyword. The present exemplary embodiment illustrates the inquiry form button 405 for which "allocate (folder)" is set by way of example. A description of operation to be performed when other options are selected in the flowchart to be described below will be omitted.

A pull-down 606 is an object for selecting a transmission type for transmitting image data generated by a document being read. The pull-down 606 enables selection of any one of "file", "email", and "USB memory". In a case where "file" is selected and a switch button 607 is selected, image data is transmitted to a folder in the PC 104, or the file server 102 by using a protocol such as an SMB protocol, FTP, WebDAV, or Secure Shell (SSH) File Transfer Protocol (SFTP). In a case where "email" is selected, image data is transmitted to the destination by using an SMTP. In a case where "USB memory" is selected, image data is stored in the USB memory, which is the external storage device 210 connected to the MFP 101. The present exemplary embodiment illustrates the inquiry form button 405 for which "file" is set by way of example. A description of operation to be performed when other options are selected in the flowchart to be described below will be omitted.

The switch button 607 is used for switching the setting of the transmission type to the transmission type displayed in the pull-down 606. When the switch button 607 is selected in a state where the transmission type is selected in the pull-down 606, the selected transmission type is displayed in an item 608.

The item 608 is an item in which various settings, such as a reading setting for reading in the one-touch scan-and-send function, and a transmission setting for transmission, can be input. In addition, for example, settings for a transmission destination, a reading size, a file format, and a document orientation can be input in the item 608.

The area 609 is an area for displaying a transmission destination where image data generated by a document being read is transmitted. The destination set in this case is a folder path to be combined with a character string in a text object to be described below. The area 609 is a text area in which data input or editing is not allowed. An address selected on an address selection screen is displayed in the area 609.

When a selection button 610 is selected from an address book by the user, an address selection screen 800 on which addresses included in the address book stored in the MFP 101 can be selected is displayed.

A pull-down 611 is a pull-down for setting a file format used to convert image data generated by an image of a document being read into a file. A file is generated based on the selected format.

An OK button 612 is a button for storing, in the storage 204, the one-touch-send button setting with the settings made on the button setting editing screen 600. When the OK button 612 is selected, the setting is stored in the storage 204. A cancel button 613 is a button for discarding the settings. When the OK button 612 or the cancel button 613 is pressed, the one-touch scan-and-send setting screen 500 illustrated in FIG. 5 is displayed.

FIG. 7 illustrates an example of a character recognition processing setting screen. The keyword character string setting screen 700 illustrated in FIG. 7 is displayed on the display device 311 when the keyword character string setting button 604 illustrated in FIG. 6 is selected.

A pull-down 701 is an object for setting a predetermined condition for the type of a character string obtained in character recognition processing. FIG. 7 illustrates a screen on which "only numbers" is selected. However, the condition selected with the pull-down 701 is not limited to this example. For example, "only alphabets", "only numbers and alphabets", "only Hiragana characters", "only Chinese characters", or "only Chinese characters and Hiragana characters" can be selected. As described in detail below, image data from which a character string that does not satisfy the condition selected in the pull-down 701 is obtained is treated as image data for which a character recognition error has occurred.

An input field 702 is an object for setting a lower limit of the number of characters included in the character string obtained in character recognition processing. An input field 703 is an object for setting an upper limit of the number of characters included in the character string obtained in character recognition processing. As described in detail below, image data from which a character string that does not satisfy the input condition is obtained is treated as image data for which the character recognition error has occurred.

Input fields 704 to 707 are objects for setting a range in which character recognition processing is executed in the coordinates of image data. The character recognition processing to be described below is executed based on values input in the input fields 704 to 707. In the present exemplary embodiment, it is assumed that a character recognition area is designated by using an X-coordinate and a Y-coordinate of a start point based on an upper left position of a document and by representing the width and height in units of cm. As the units, "mm" or "inch" may also be used. Instead of the designation method using numerical values, a designation method using a document preview image and a graphical user interface (GUI) may be used. For example, the user may designate a character recognition range graphically by operating each end of a rectangle. In the present exemplary embodiment, it is assumed that an area in which a patient identification (ID) in an inquiry form is set as the character recognition area.

An input field 708 is an object for inputting a transmission destination (folder) to which image data for which the character recognition error has occurred is transmitted. For example, a folder path "\\file server\error folder" is input.

An OK button 709 is used for storing the settings selected or input at the time in the storage 204 when the button is selected by the user.

A cancel button 710 is used for discarding the settings selected or input at the time and displaying the button setting editing screen 600 on the display device 311 when the button is selected by the user.

FIG. 8 illustrates an example of the address selection screen 800. The address selection screen 800 is displayed when the selection button 610 is selected from the address book on the button setting editing screen 600 illustrated in FIG. 6. The address selection screen 800 illustrated in FIG. 8 is displayed on, for example, the display device 311 connected to the PC 104 that has accessed the web server of the MFP 101 by HTTP communication.

A pull-down 801 is a list for switching the type of the address book to be displayed on the address selection screen 800. The pull-down 801 enables selection of one of "best members", and "speed dial" (not illustrated).

A display switching button 802 is used for changing the type of the address book to be displayed on the address selection screen 800 to the type displayed in the pull-down 801 when the button is selected by the user.

An area 803 is a display area in which the name of the address book is displayed. A list 804 is an area in which a list of addresses is displayed, and includes a selectable checkbox, "number", "type", "name", and "destination". The checkbox includes two types, i.e., a checkable checkbox and an uncheckable checkbox, and the checkbox of one of the two types is displayed. For "number", a management number of each address is displayed. For an area indicated by "Type", an icon is displayed, and the icon to be displayed varies depending on the type of the address. For "name", a name with which the address is named is displayed. For "destination", an address is displayed.

When an OK button 805 is selected in a state where the checkbox is checked, the address is displayed in the area 609. The MFP 101 receives the address from the PC 104 over HTTP communication, and stores the received address in the storage 204 as the address of the transmission destination of the image data.

Additional descriptions will be provided of the display of a checkable checkbox and an uncheckable checkbox. FIG. 8 illustrates a screen displayed in a case where an address is selected from the address book of "best members", in which two addresses with the transmission type of "email" are registered and two addresses with the transmission type of "file" are registered, in a state where "file" is selected in the pull-down 606 illustrated in FIG. 6. Thus, on the address selection screen 800, the destination corresponding to the set transmission type can be selected using a checkable checkbox. A checkable checkbox is displayed for the address that matches the type selected in the pull-down 606. More specifically, uncheckable checkboxes are displayed for the addresses of number 01 and number 02, and checkable checkboxes are displayed for the addresses of number 03 and number 04.

The OK button 805 is used for entering the selected addresses with the settings made on the address selection screen 800. A cancel button 806 is used for discarding the settings. When the OK button 805 or the cancel button 806 is selected, the button setting editing screen 600 illustrated in FIG. 6 is displayed.

The setting of the inquiry form button 405 according to the present exemplary embodiment will now be described. The inquiry form button 405 is registered in a state where "inquiry form" is input in the input field 601, "button name" is selected in the pull-down 602, and the checkbox 603 is checked on the button setting editing screen 600 illustrated in FIG. 6. The inquiry form button 405 is registered in a state where "organize (folder)" is selected in the pull-down 605 and "file" is selected in the pull-down 606 on the button setting editing screen 600 illustrated in FIG. 6. The inquiry form button 405 is registered in a state where "only numbers" is selected in the pull-down 701, "3" is input in the input field 702, and "10" is input in the input field 703. The inquiry form button 405 is registered in a state where "\\file server\error folder" is selected in the input field 708 and the destination "\\file server\inquiry form" of number 04 is selected on the address selection screen 800 illustrated in FIG. 8.

Figure 9:
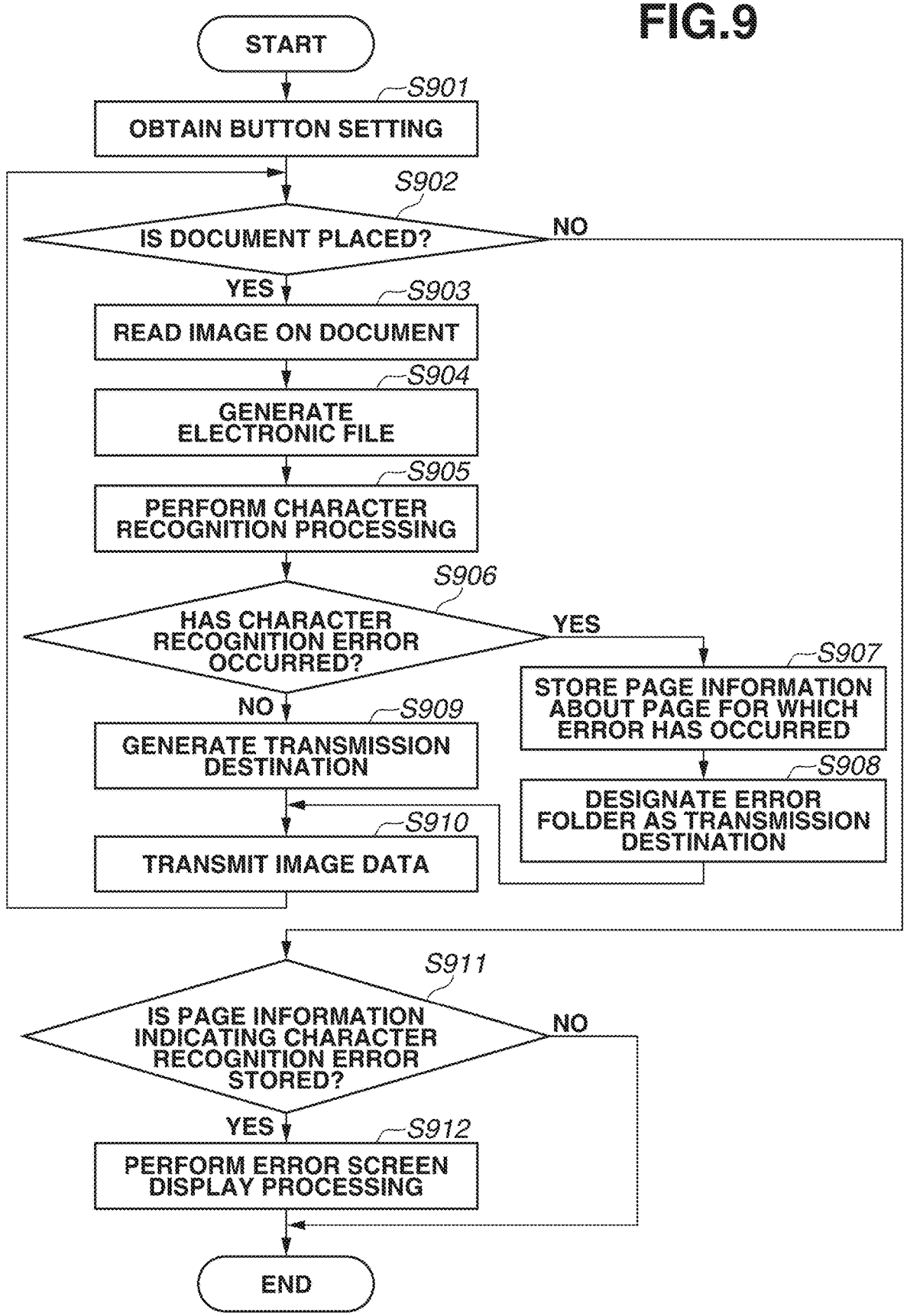
FIG. 9 is a flowchart illustrating an example of one-touch scan-and-send processing.

FIG. 9 is a flowchart illustrating an example of one-touch scan-and-send processing. The CPU 201 reads a program stored in the ROM 202 into the RAM 203, and executes the read program to execute processing in the flowchart illustrated in FIG. 9. The flowchart illustrated in FIG. 9 is executed when the inquiry form button 405 is selected by the user on the home screen 400 displayed on the operation unit 205.

In step S901, the CPU 201 obtains the setting of the inquiry form button 405 that is made through the operation device 310 and the display device 311.

In step S902, the CPU 201 determines whether a document is placed on a document tray (not illustrated). If the CPU 201 determines that a document is placed (YES in step S902), the processing proceeds to step S903. If the CPU 201 determines that no document is placed (NO in step S902), the processing proceeds to step S910.

In step S903, the scanner 207 conveys documents placed on the document tray one by one and reads an image on each document under the control of the CPU 201, thus generating image data. The image data generated here may be image data obtained by binary compression.

In step S904, the CPU 201 generates an electronic file based on the setting of the file format obtained in step S901 from the image data generated in step S903. Since "PDF" is set in the inquiry form button 405, image data in a PDF file is generated. The generated image data, such as a PDF file, is stored in the storage 204.

In step S905, the CPU 201 performs character recognition processing on the image data generated in step S903 based on the character recognition area set in the input fields 704 to 707 on the keyword character string setting screen 700 illustrated in FIG. 7, thus obtaining a character string.

In step S906, the CPU 201 determines whether the character recognition error has occurred. Specifically, the CPU 201 determines whether the character string obtained in step S905 satisfies the condition set on the keyword character string setting screen 700 illustrated in FIG. 7. For example, in a case where "only numbers" is selected in the pull-down 701 and the character string obtained as a result of processing includes characters other than numbers, the CPU 201 determines that the character string does not satisfy the condition. In a case where the character string including the number of characters that is less than the lower limit set in the input field 702, or more than the upper limit set in the input field 703 is obtained, the CPU 201 also determines that the character string does not satisfy the condition. If the CPU 201 determines that the condition is satisfied (YES in step S906), the processing proceeds to step S907. If the CPU 201 determines that the condition is not satisfied (NO in step S906), the processing proceeds to step S909.

In step S907, the CPU 201 stores in the RAM 203 page information about a page for which an error has occurred. The page information may be stored in the storage 204.

FIGS. 10A and 10B each illustrating an example of page information which is stored will now be described. FIG. 10A illustrates an example of page information, and FIG. 10B illustrates an example of an error flag. FIG. 10A illustrates an example of page information. Page information 1000 may be stored in the RAM 203, or may be stored in the storage 204.

The page information 1000 includes a job ID, a page number, a character string obtained through character recognition processing, image data from which the character recognition area of image data for which the character recognition error has occurred is cut off, image data for which the character recognition error has occurred, and a file name.

A job ID 1001 is an ID of a job for which the character recognition error has occurred. The job ID 1001 is an ID for uniquely identifying the job.

A page number 1002 is information indicating the page number of image data in which the character recognition error has occurred.

A character recognition result 1003 is information indicating the character string obtained in the character recognition processing in step S905. For example, " " indicates a blank, which indicates that no character string is obtained as a result of character recognition processing. "///////" indicates a character string obtained by erroneously recognizing "1111111". If no character string is obtained in step S906, "null" or "0" may be stored.

Character recognition area image data 1004 is information indicating an address of an area in which image data on the character recognition area is stored, and information indicating the size of the image data.

Error page image data 1005 is information indicating an address of an area in which image data in which an error has occurred is stored, and information indicating the size of the image data.

A transmission file name 1006 is information indicating the name of an electronic file to be transmitted. For example, when an electronic file is generated on 2019-05-01 08:47:02, the generated file is named with "20190501084702.pdf". The date and time when the file is generated may be used as the file name, or the character string obtained in step S905 may also be used as the file name.

FIG. 10B illustrates an example of an error flag. In step S907, the error flag is stored in the RAM 203 when page information is stored in the RAM 203. If an error has occurred on the third page and the seventh page as illustrated in FIG. 10A, the error flag "1", which indicates that an error has occurred, for each of the third page and the seventh page is stored. The error flag "0", which indicates that no error has occurred, for the pages on which no error has occurred is stored.

In step S908, the CPU 201 sets a transmission destination (folder path) of an error folder set in the input field 708 on the keyword character string setting screen 700 as the transmission destination of the electronic file (image data) generated in step S902. In the example of the inquiry form button 405, "\\file server\error folder" is set as the transmission destination.

In step S909, the CPU 201 generates the folder path (transmission destination) in which the character string obtained in step S906 is added to the lowermost layer of the folder path displayed in the area 609. Specifically, in a case where "123" is obtained as the character string, a folder path "\\file server\inquiry form\123" is generated.

In step S910, the CPU 201 transmits the image data (PDF file) generated in step S904 to the folder indicated by the folder path designated in step S908 or the folder path generated in step S909. More specifically, the CPU 201 transmits the image data to the file server 102 by using an SMB or FTP, and stores the image data in the folder indicated by the designated folder path.

Processing which is performed if it is determined that no document is placed in step S902 will now be described. In step S911, the CPU 201 determines whether the error flag "1" is stored in the RAM 203. If it is determined that the error flag "1" is stored (YES in step S911), the processing proceeds to step S912. If it is determined that the error flag "1" is not stored (NO in step S911), the processing is terminated.

In step S912, the CPU 201 displays an error screen on the operation unit 205. The error screen displayed in this case will be described in detail below with reference to FIGS. 11A and 11B.

FIGS. 11A and 11B each illustrate an example of the error screen. The error screen illustrated in FIGS. 11A and 11B is displayed on the touch panel 410 of the operation unit 205. The error screen illustrated in FIGS. 11A and 11B may be displayed on the display device 311 of the PC 104.

A message 1101 indicating that the character recognition processing has failed is displayed on an error screen 1100 illustrated in FIG. 11A. The message 1101 is also used to prompt the user to check if there is any problem with a document.

A preview image 1102 is also displayed on the error screen 1100. The preview image 1102 is a preview image of the image based on the image data in which an error has occurred in the character recognition processing. The user can check for which document an error has occurred by referring to the preview image 1102.

A highlight 1103 is an object for highlighting the character recognition area in the preview image 1102. The user can check the character string recognized through the character recognition processing by checking the character string in the highlight 1103.

When the user touches (selects) an area in the vicinity of the highlight 1103, an error screen 1110 illustrated in FIG. 11B is displayed.

On the error screen 1110, the highlighted character recognition area is enlarged and displayed. The error screen 1110 may be displayed instead of the error screen 1100.

On the error screen 1110, a job ID may be displayed in addition to a page number 1104 and a file name 1105.

The page number 1104 indicates the page number of the displayed preview image. The user can check for which page the character recognition error has occurred by checking the page number 1104.

The file name 1105 is a file name to be given to an image file corresponding to the displayed preview image when the image file is stored in the error folder. The user can check which image corresponds to which file, without opening the file in the error folder, by checking the file name 1105.

A scroll bar 1106 is an object for scrolling the screen to display a preview image of three or more pages if the character recognition error has occurred in three or more pages.

An OK button 1107 is a button for closing the error screen 1100 and displaying the home screen 400 when the button is selected by the user.

FIGS. 11A and 11B each illustrate an example where, in a case where a certain display area is secured within the touch panel, the user can easily check the image data for which the character recognition error has occurred, by displaying a preview image.

Figure 12A:
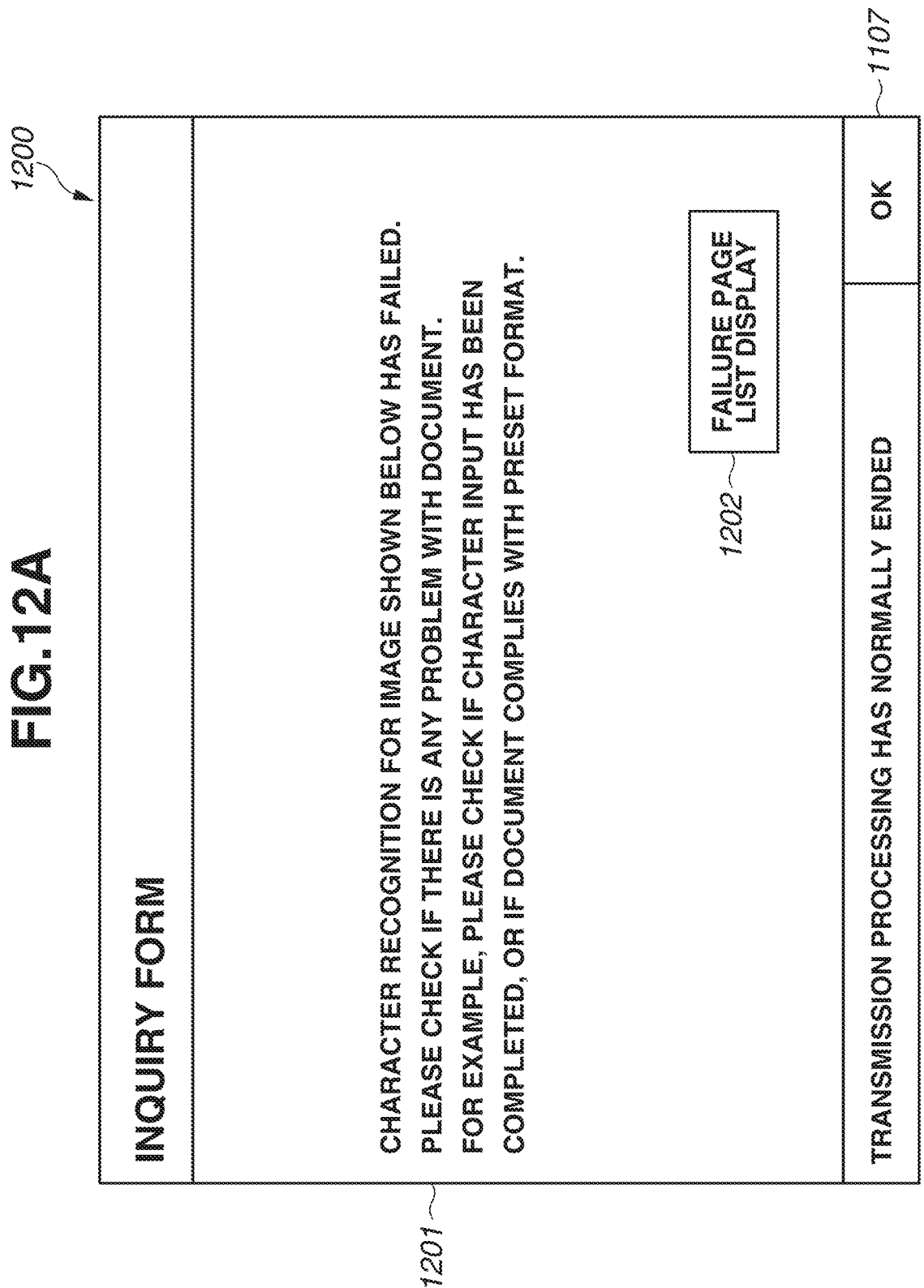

FIGS. 12A and 12B each illustrate an example of the error screen to be displayed when the display area within the touch panel is not sufficiently large. FIG. 12A illustrates an example of an error screen 1200.

Unlike the error screen 1110 illustrated in FIG. 11B, the error screen 1200 does not have an area in which a preview image large enough for the user to check can be displayed. Accordingly, a message, such as a message 1201, which indicates that the character recognition processing has failed, is displayed.

A failure page list display button 1202 is also displayed on the error screen 1200. When the failure page list display button 1202 is selected by the user, an error screen 1210 illustrated in FIG. 12B is displayed.

Buttons 1211 and 1212 are displayed on the error screen 1210 illustrated in FIG. 12B. The button 1211 is a button for displaying information indicating the page for which the character recognition error has occurred, and for displaying an error screen 1300 illustrated in FIG. 13 when the button is selected by the user. In this example, the button 1211 indicates that the character recognition error has occurred on the third page. The button 1212 is also a button for displaying information indicating the page for which the character recognition error has occurred, and for displaying an error screen, such as the error screen 1300, when the button is selected by the user. In this example, the button 1212 indicates that the character recognition error has occurred on the seventh page.

The error screen 1210 may be displayed without displaying the error screen 1200.

FIG. 13 illustrates an example of the error screen 1300. The error screen 1300 is displayed when the button 1211 or 1212 on the error screen 1210 is selected.

On the error screen 1300, the character recognition area of the image based on the image data for which the character recognition error has occurred is enlarged and displayed, as in the error screen 1110. In addition, the job ID, the number of pages, and the file name are displayed.

A back button 1301 is a button for displaying the error screen 1210 when the button is selected by the user.

The above-described processing provides a mechanism for enabling the user to easily check from which image data an erroneous character string is obtained in the image processing apparatus that stores image data in a folder named with a character string obtained through character recognition processing. In addition, searchability for searching a transmitted file is improved by simultaneously displaying a transmission file name and the like.

A second exemplary embodiment of the disclosure will be described below. The first exemplary embodiment described above illustrates an example where, if there is any page for which the character recognition processing has failed, information about the page for which the character recognition processing has failed is displayed on the operation unit 205. The present exemplary embodiment illustrates an example where, if the display area of the operation unit 205 (touch panel or display) is extremely small, information about the page for which the character recognition error has occurred is transmitted as an error log to, for example, the error folder and the PC 104.

Figure 14:
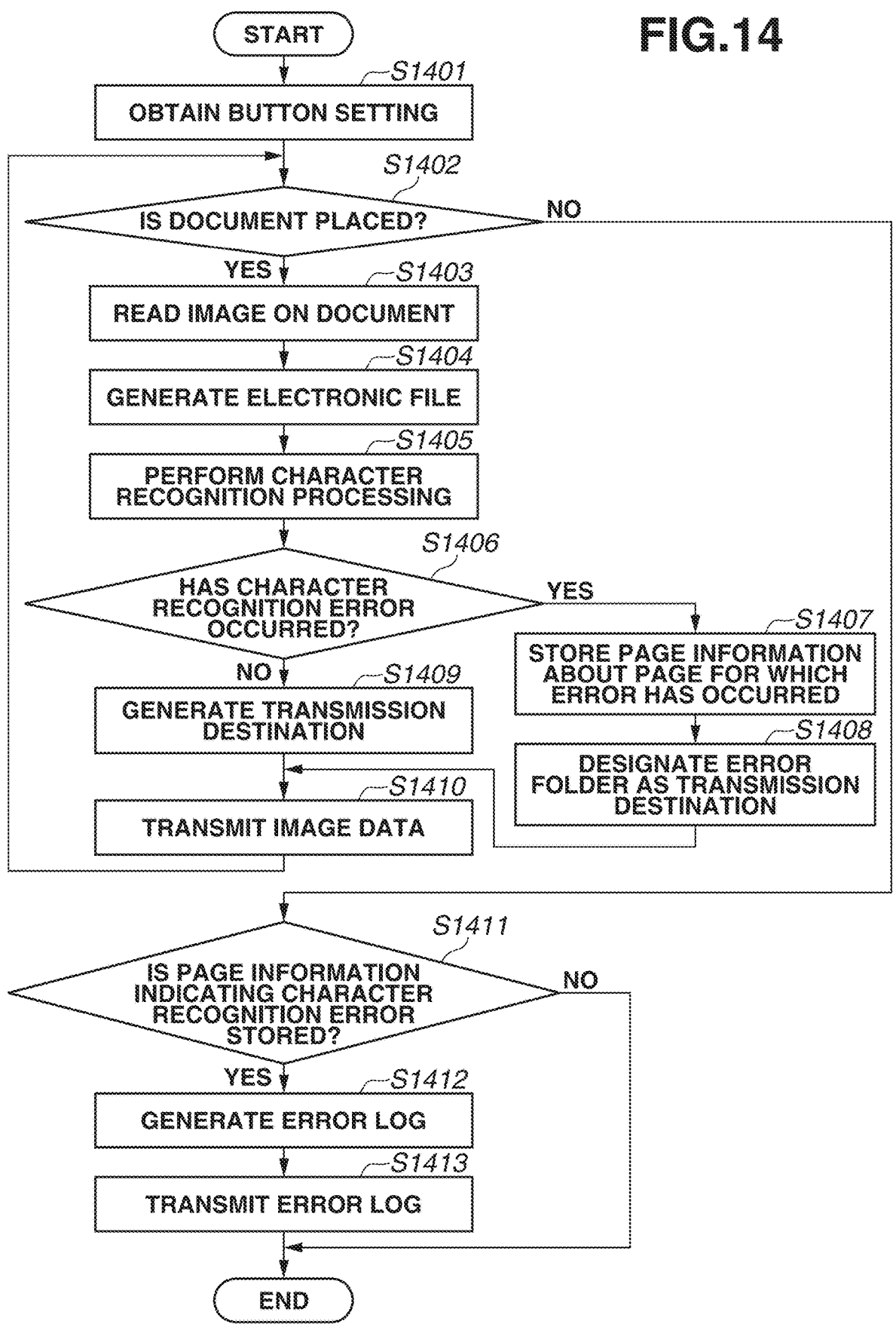
FIG. 14 is a flowchart illustrating an example of one-touch scan-and-send processing.

FIG. 14 is a flowchart illustrating an example of one-touch scan-and-send processing. The processing in the flowchart illustrated in FIG. 14 is executed by the CPU 201 reading a program stored in the ROM 202 into the RAM 203 and executing the read program. The flowchart illustrated in FIG. 14 is executed when the form button 405 is selected by the user on the home screen 400 displayed on the operation unit 205.

Operations in steps S1401 to S1411 illustrated in FIG. 14 are similar to the operations in the corresponding steps in the flowchart illustrated in FIG. 9, and thus the descriptions thereof are omitted.

In step S1411, if it is determined that information about the page for which the character recognition error has occurred is stored (YES in step S1411), the processing proceeds to step S1412. In step S1412, the CPU 201 generates an error log based on the page information stored in step S1407. The error log generated in this example may be image data (PDF, JPEG, etc.) as illustrated in FIG. 16, or may be text data.

FIG. 15 illustrates an example of the error log. In an error log 1500, a date and time when an error has occurred, a given file name, a job ID, a page number, a character recognition result, and a character recognition area image 1501 are described. The character recognition area image 1501 and a character recognition area image 1502 are enlarged images of the character recognition area of the image based on the image data in which the character recognition error has occurred.

In step S1413, the CPU 201 controls the error log generated in step S1412 to be stored in a preset error folder. Apart from the input field 708 of the error folder, a setting of a destination made by the user may be received and the error log may be transmitted to the destination. For example, the MFP 101 may receive a setting of a mail address, and may transmit the error log to the mail address. The file name of the error log may include the date when the error log is generated, or may be a file name indicating the error log, such as "error log" and "ErrorLog".

As described above, in a case where the display area is extremely small, page information about the page for which the character recognition error has occurred is transmitted and stored as an error log, thus enabling the user to check in which document the character recognition error has occurred, without the need for the user to open each image data file in the error folder.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-120046, filed Jun. 27, 2019, which is hereby incorporated by reference herein in its entirety.

What is claimed is:

1. An image processing apparatus comprising:
a display; and
a controller;
wherein the controller obtains character information from image data,
wherein the controller determines whether the obtained character information satisfies a predetermined condition,
wherein the controller specifies a storage destination based on first character information that has been obtained from first image data and that satisfies the predetermined condition and performs a process for storing the first image data in the specified storing destination, and
wherein the controller controls the display to display first information corresponding to second image data from which second character information not satisfying the predetermined condition has been obtained and second information indicating error based on the obtained second character information.

2. The image processing apparatus according to claim 1, wherein the first information corresponding to the second image data is an image of the image data, and
wherein the controller controls the display to display the image of the second image data from which the second character information not satisfying the predetermined condition has been obtained and the second information indicating the error based on the obtained second character information.

3. The image processing apparatus according to claim 2, wherein the controller controls the display to display the image of the image data from which the second character information not satisfying the predetermined condition has been obtained and not to display an image of the first image data from which the first character information satisfying the predetermined condition has been obtained.

4. The image processing apparatus according to claim 1, wherein the specified storage destination is a folder specified based on the first character information.

5. The image processing apparatus according to claim 4, wherein the controller obtains the character information by performing a character recognizing process on the image data.

6. The image processing apparatus according to claim 1, wherein the predetermined condition is a condition about the number of characters indicated by the obtained character information.

7. The image processing apparatus according to claim 1, wherein the predetermined condition is a condition about a type of one or more characters indicated by the obtained character information.

8. The image processing apparatus according to claim 1, further comprising:
a scanner that scans one or more documents,
wherein the scanner scans, based on one execution instruction, a first document and a second document and then generates the first image data and the second image data, and
wherein the controller controls the display to display the first information and the second information after the controller performs the process for storing the first image data in the storing destination specified based on the first character information.

9. The image processing apparatus according to claim 1, wherein the controller controls the display to display the first information and second information on a predetermined screen.

10. The image processing apparatus according to claim 1, further comprising:
a communicator,
wherein the communicator transmits, on the basis that the controller performs the process for storing the first image data in the specified storing destination, the first image data for storing in the specified storing destination.

11. An image processing method comprising:
obtaining character information from image data;
determining whether the obtained character information satisfies a predetermined condition;
specifying a storage destination based on first character information that has been obtained from first image data and that satisfies the predetermined condition and performing a process for storing the first image data in the specified storing destination; and
controlling a display to display first information corresponding to second image data from which second character information not satisfying the predetermined condition has been obtained and second information indicating error based on the obtained second character information.

12. A non-transitory computer-readable storage medium storing a program that for causing a computer to perform an image processing method, the an image processing method comprising:

obtaining character information from image data;

determining whether the obtained character information satisfies a predetermined condition;

specifying a storage destination based on first character information that has been obtained from first image data and that satisfies the predetermined condition and performing a process for storing the first image data in the specified storing destination; and controlling a display to display first information corresponding to second image data from which second character information not satisfying the predetermined condition has been obtained and second information indicating error based on the obtained second character information.

\* \* \* \* \*